United States Patent
Stahl et al.

(10) Patent No.: US 12,516,708 B2
(45) Date of Patent: Jan. 6, 2026

(54) MOTOR VEHICLE DISC BRAKE FRICTION LINING WITH WIRE HELICAL SPRING

(71) Applicant: Continental Automotive Technologies GmbH, Hannover (DE)

(72) Inventors: Michael Stahl, Mainz (DE); Jaroslav Lihocky, Krupina (SK); Jochem Rausch, Essenheim (DE)

(73) Assignee: Continental Automotive Technologies GmbH, Frankfurt am Main (DE)

( * ) Notice: Subject to any disclaimer, the term of this patent is extended or adjusted under 35 U.S.C. 154(b) by 509 days.

(21) Appl. No.: 17/996,988

(22) PCT Filed: Apr. 23, 2021

(86) PCT No.: PCT/DE2021/200051
§ 371 (c)(1),
(2) Date: Oct. 24, 2022

(87) PCT Pub. No.: WO2021/213594
PCT Pub. Date: Oct. 28, 2021

(65) Prior Publication Data
US 2023/0193965 A1    Jun. 22, 2023

(30) Foreign Application Priority Data
Apr. 24, 2020 (DE) ................. 10 2020 205 227.1

(51) Int. Cl.
*F16D 65/097* (2006.01)
*F16D 55/226* (2006.01)

(52) U.S. Cl.
CPC ....... *F16D 65/0976* (2013.01); *F16D 55/226* (2013.01)

(58) Field of Classification Search
CPC ................ F16D 65/0976; F16D 55/226
(Continued)

(56) References Cited

U.S. PATENT DOCUMENTS 4,289,217 A * 9/1981 Heibel ............... F16D 65/0976
188/73.38
4,537,291 A * 8/1985 Thiel .................. F16D 65/0976
188/73.38
(Continued)

FOREIGN PATENT DOCUMENTS

| CN | 104956113 A | 9/2015 |
| DE | 2930601 A1 | 2/1980 |

(Continued)

OTHER PUBLICATIONS

German Search Report dated Feb. 27, 2023 for the counterpart German Patent Application No. 20 2020 005 763.0.
(Continued)

*Primary Examiner* — Christopher P Schwartz

(57) ABSTRACT

A motor vehicle disk brake friction lining 1 with a wire helical spring in the form of a hold-down spring is mounted with a clamping fit and in a straddling position radially from the outside on a spring saddle. The wire helical spring is formed from a non-rusting, alloyed steel wire material; rust-protected steel wire material. The spring may be a surface-treated steel wire material, for example sheathed, painted, coated or the like. Lims of the spring engage with shaped profiles over a central protrusion of a carrier plate such that support portions are arranged substantially centrally in alignment with a longitudinal axis through the carrier plate. A height level of said support portions is arranged, substantially radially below the height level of the protrusion in relation to the radial axis.

31 Claims, 5 Drawing Sheets

(58) Field of Classification Search
USPC .......................................... 188/73.36–73.38
See application file for complete search history.

(56) References Cited

U.S. PATENT DOCUMENTS

| | | | |
|---|---|---|---|
| 9,657,793 B2 * | 5/2017 | Sander | ................ F16D 65/0976 |
| 2014/0339026 A1 | 11/2014 | Gutelius | |
| 2015/0362028 A1 | 12/2015 | Sander | |

FOREIGN PATENT DOCUMENTS

| | | | |
|---|---|---|---|
| DE | 3220632 | C2 | 12/1983 |
| DE | 3445488 | A1 | 2/1986 |
| DE | 3508066 | A1 | 9/1986 |
| DE | 3621507 | A1 | 1/1988 |
| DE | 3621507 | C2 | 1/1988 |
| DE | 4006692 | A1 | 9/1991 |
| DE | 4138933 | A1 | 6/1993 |
| DE | 4303961 | A1 | 8/1994 |
| DE | 4424084 | A1 | 1/1996 |
| DE | 10333420 | A1 | 1/2005 |
| DE | 10351477 | B4 | 6/2005 |
| DE | 102013216592 | A1 | 7/2014 |
| EP | 0610919 | A1 | 8/1994 |
| FR | 2296126 | A1 | 7/1976 |
| JP | 2003148525 | A | 5/2003 |

OTHER PUBLICATIONS

European Examination Report dated Nov. 11, 2024 for the counterpart European Patent Application No. 21 724 189.2 and machine translation of same.
German Search Report dated Feb. 19, 2021 for the counterpart German Patent Application No. 10 2020 205 227.1.
The International Search Report and the Written Opinion of the International Searching Authority mailed on Jun. 17, 2021 for the counterpart PCT Application No. PCT/DE2021/200051.
First Notice of Examination dated Mar. 27, 2025 for the counterpart Chinese Patent Application and machine translation of same.
Second Notice of Examination dated Aug. 8, 2025 for the counterpart Chinese Patent Application and machine translation of same.

* cited by examiner

MOTOR VEHICLE DISC BRAKE FRICTION LINING WITH WIRE HELICAL SPRING

CROSS-REFERENCE TO RELATED APPLICATIONS

The present application is a National Stage Application under 35 U.S.C. § 371 of International Patent Application No. PCT/DE2021/200051 filed on Apr. 23, 2021, and claims priority from German Patent Application No. 10 2020 205 227.1 filed on Apr. 24, 2020, in the German Patent and Trademark Office, the disclosures of which are herein incorporated by reference in their entireties.

TECHNICAL FIELD

The invention relates to a motor vehicle disk brake friction lining assembly.

BACKGROUND

DE 103 51 477 B4 documents a known disk brake lining with a hammerhead-shaped backplate. Here, a central spring saddle protrusion allows a relatively large friction material volume in conjunction with radial installation of a hold-down spring in its embodiment as a wire-helical-spring-type hold-down spring inserted so as to be fixed in a straddling position in the spring saddle protrusion. The spring saddle is allocated in a cavity of the protrusion and is integrated so as to be set back axially inward in stepped form in relation to the backplate longitudinal axis. The spring saddle comprises a narrowed holding edge which engages in form-fitting fashion between the helical winding and with a clamping fit and which delimits the cavity. One or more helical spring windings that are right-handed in an advancing direction are arranged centrally between two spring limbs which, as seen in a front view, are bent so as to be spread horizontally to the side (laterally). Therefore, a non-uniform loading of the friction lining set during operation is avoided because precise displacement of the friction linings during operation is made possible.

Updated specifications of automobile customers define further developed air gap behavior, wherein, for example, an even more agile depletion of residual braking torque (as a reaction to the acknowledgement of a demand for a release of the brake) is demanded.

SUMMARY

A hammerhead-shaped motor vehicle disk brake friction lining 1 with a wire helical spring 5 in the form of a hold-down spring which can be mounted so as to be fixed with a clamping fit and in a straddling position radially from the outside on a saddle protrusion. Said spring mounting arrangement serves for the purpose of imparting a substantially radially inwardly directed spring preload force to the spring-mounted friction lining 1 such that the friction lining 1 is mounted with a certain elastic preload on and in a receptacle in a holding component (that is to say the resultant spring preload force is directed in a radially inward orientation toward an imaginary wheel axis of rotation). This spring force reload of a friction lining contributes, for example, to a suppression of undesired rattling noises as a result of vibrations caused for example by sections of rough road

BRIEF DESCRIPTION OF THE DRAWINGS

The present disclosure will become more fully understood from the detailed description and the accompanying drawings, wherein.

DETAILED DESCRIPTION

Figure 1A:
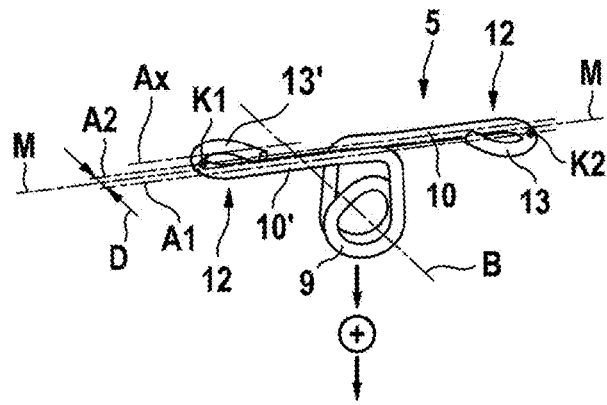
FIG. 1a illustrates a perspective view concerning conventional brake pad retaining spring (hold-down-spring) for exemplary purpose.
Figure 1B:
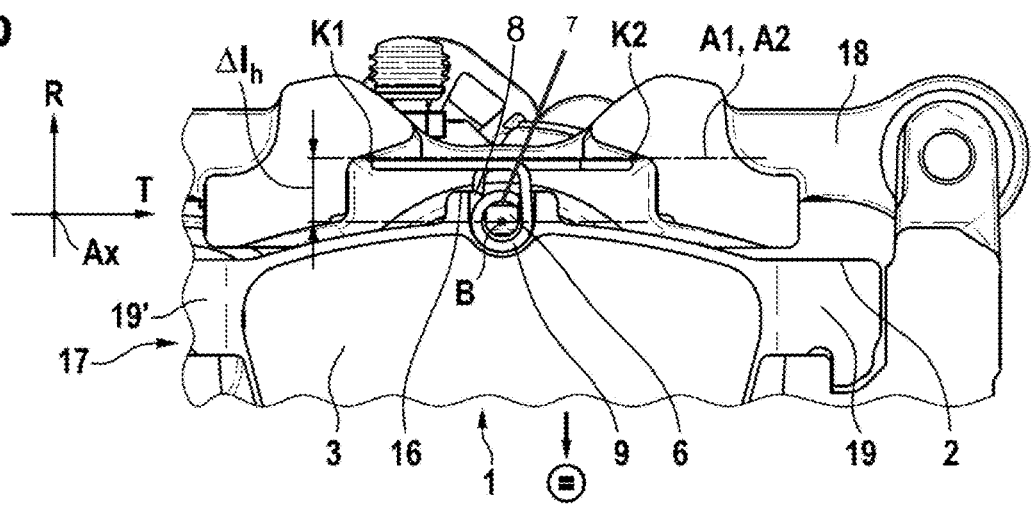
FIG. 1b illustrates a conventional spring integration in hammerhead shape disk brake pad, brake holder and brake caliper system for exemplary purpose.
Figure 1C:
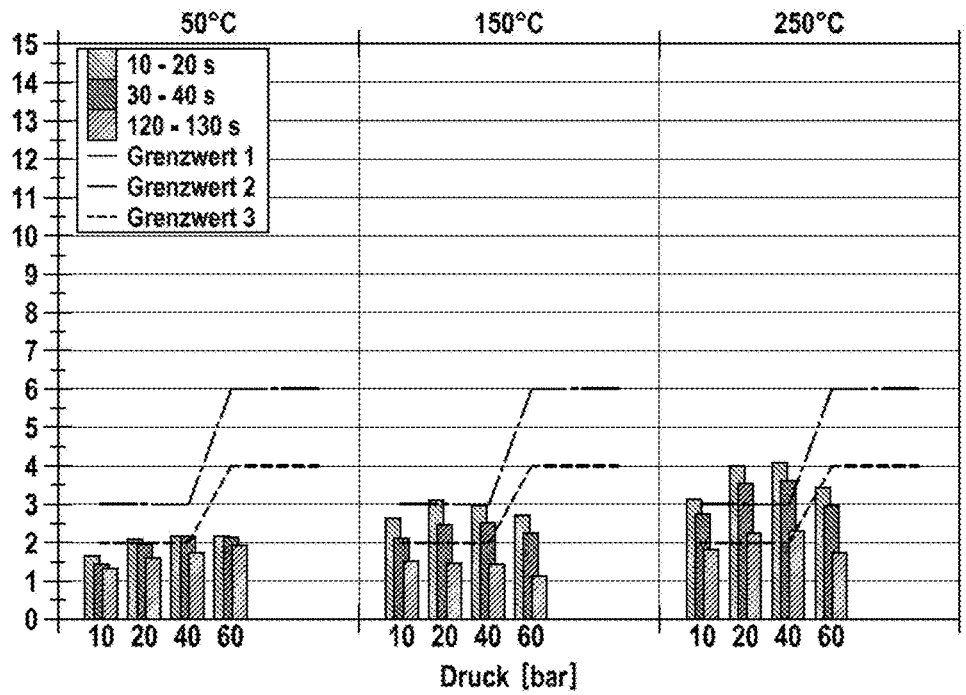
FIG. 1c illustrates different charts showing conventional disk brake spring interaction and drag behavior when in use under disk brake release from different brake pressure levels and temperatures with overall delay in stiff residual drag effects shown, for exemplary purpose.
Figure 2A:
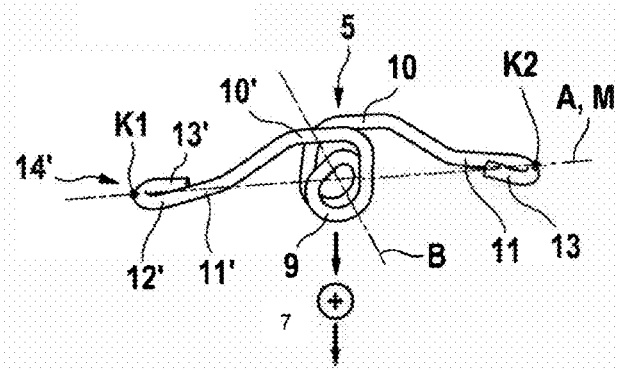
FIG. 2a illustrates a perspective view concerning an embodiment of a steel wire screw retaining spring.
Figure 2B:
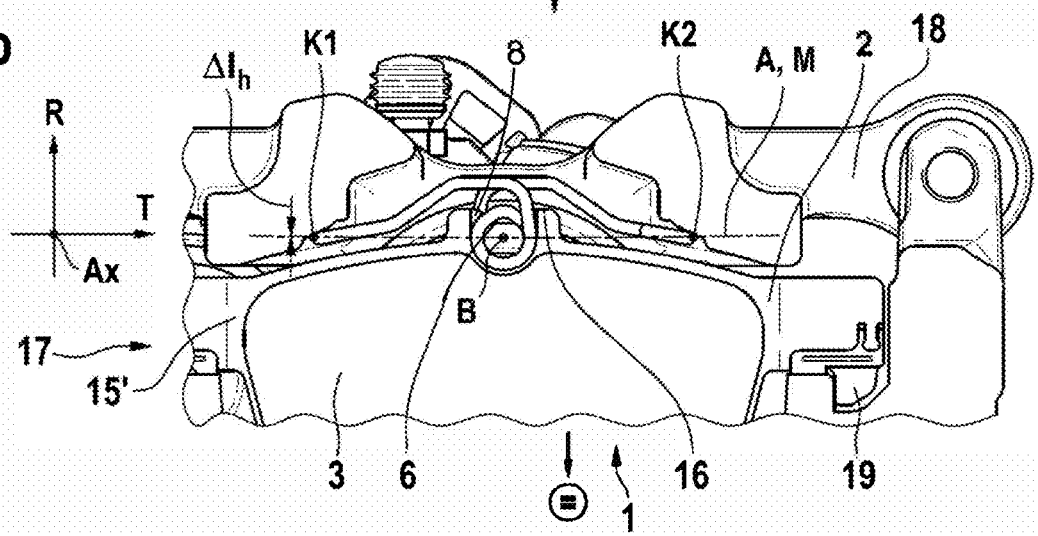
FIG. 2b illustrates an embodiment of the spring integration in hammerhead shape disk brake pad, brake holder and brake caliper system.
Figure 2C:
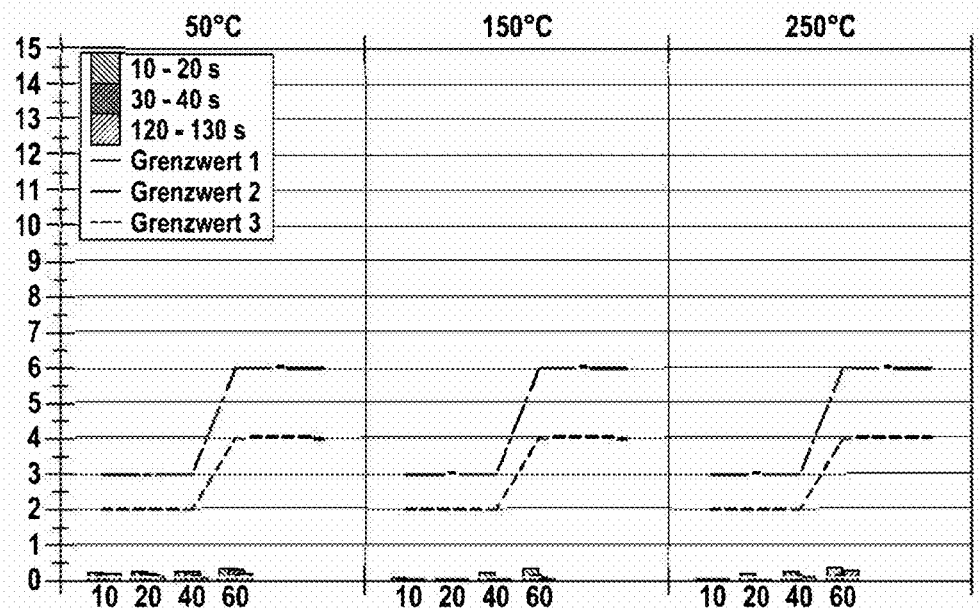
FIG. 2c illustrates charts showing hold down spring interaction with disk brake system when in use under disk brake release from different brake pressure levels and temperatures with negligible delay and low residual drag effects.
Figure 3:
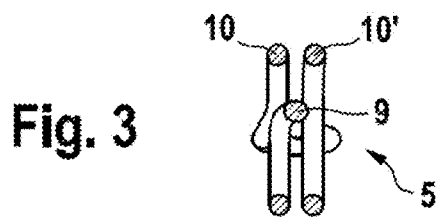
FIG. 3 illustrates the spring as of FIG. 2a in a cross sectional view.
Figure 4:
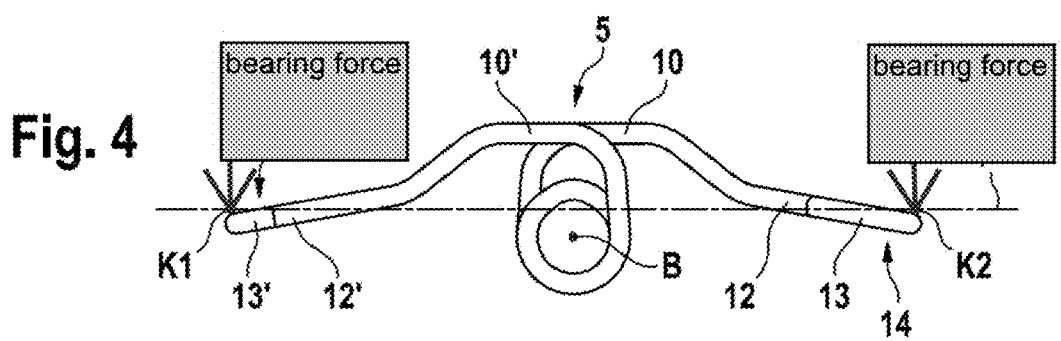
FIG. 4 illustrates the spring as of FIG. 2a from a side view.
Figure 5:
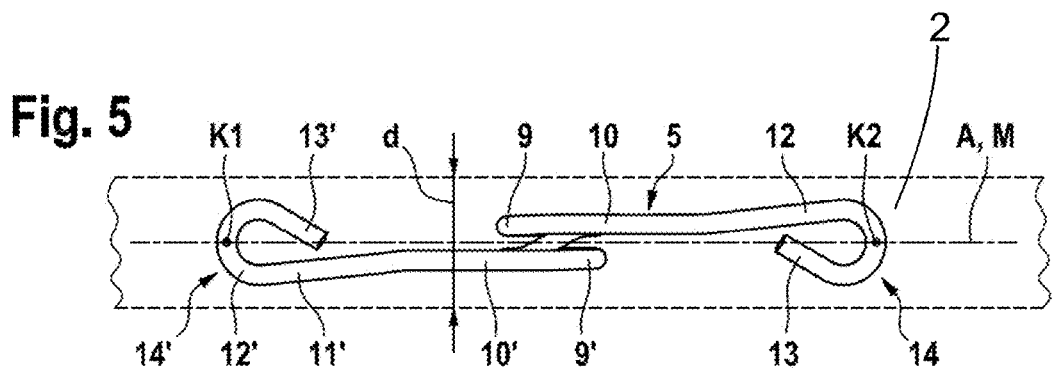
FIG. 5 illustrates the spring as of FIG. 2a from a top view.
Figure 6:
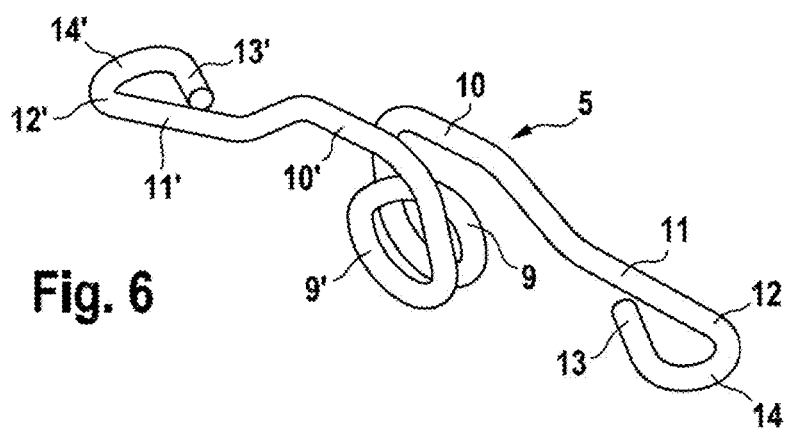
FIG. 6 illustrates another perspective view of the spring as in FIG. 2b.
Figure 7:
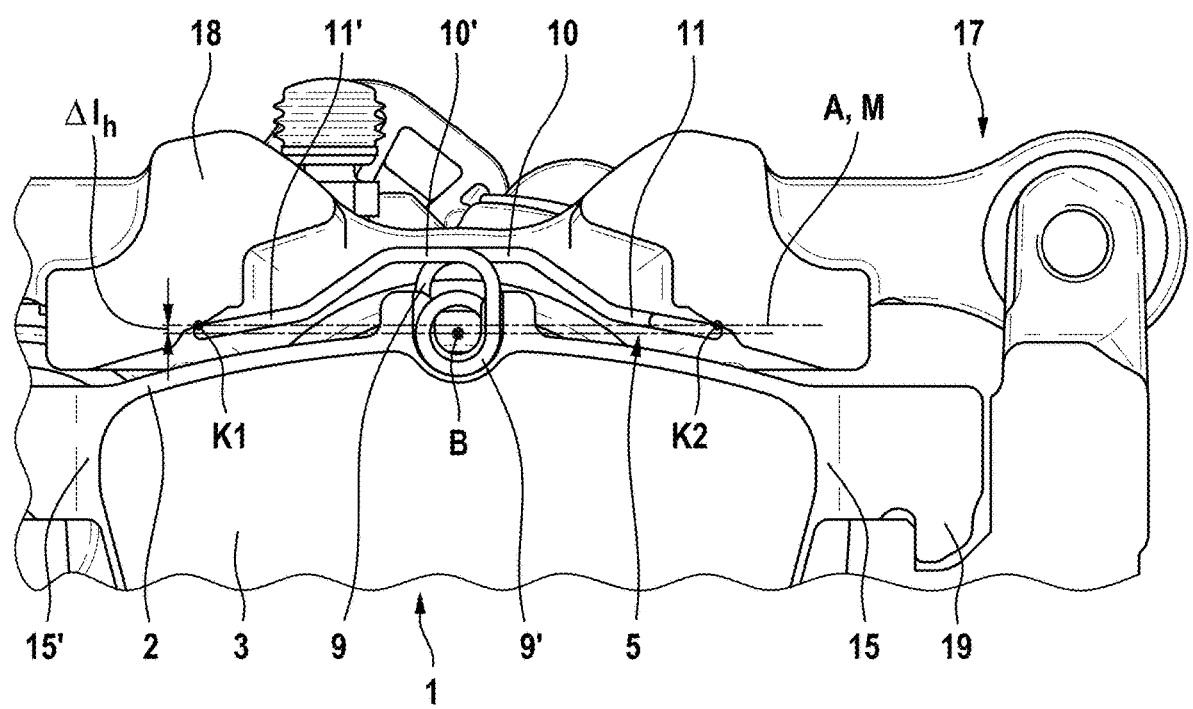
FIG. 7 illustrates an enlargement with FIG. 2b.
Figure 8:
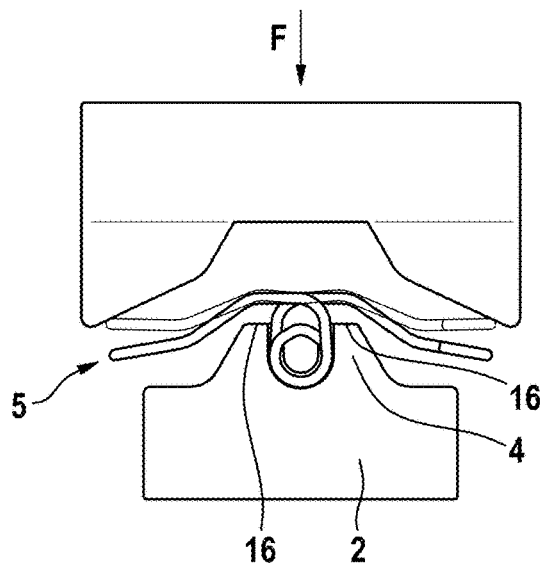
FIG. 8 illustrates an embodiment for single spring calibration step including an example for tooling among a chain of several process steps.
Figure 9:
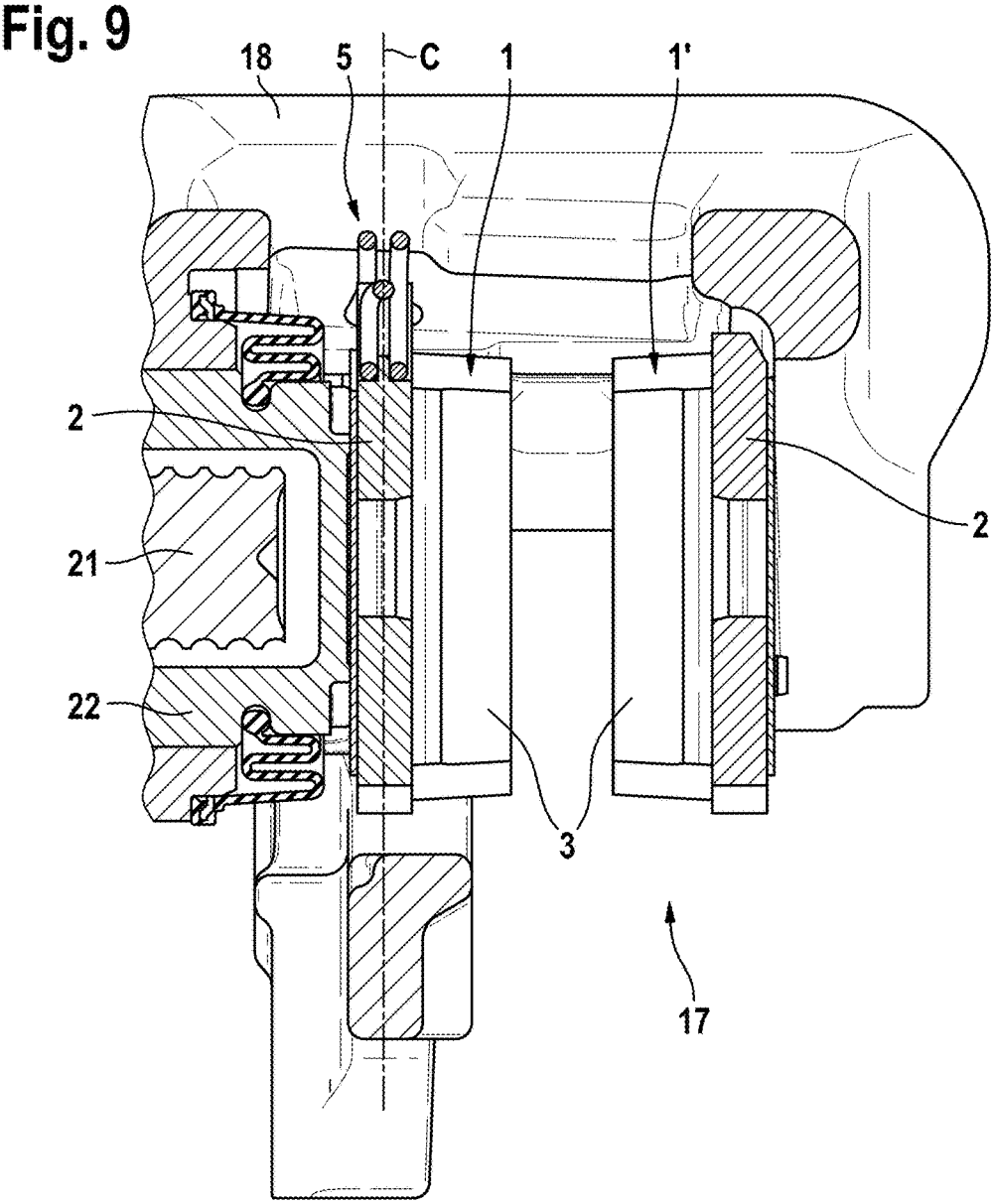
FIG. 9 illustrates a sectional view of embodiment showing assembled brake components as shown in FIG. 7.
Figure 10:
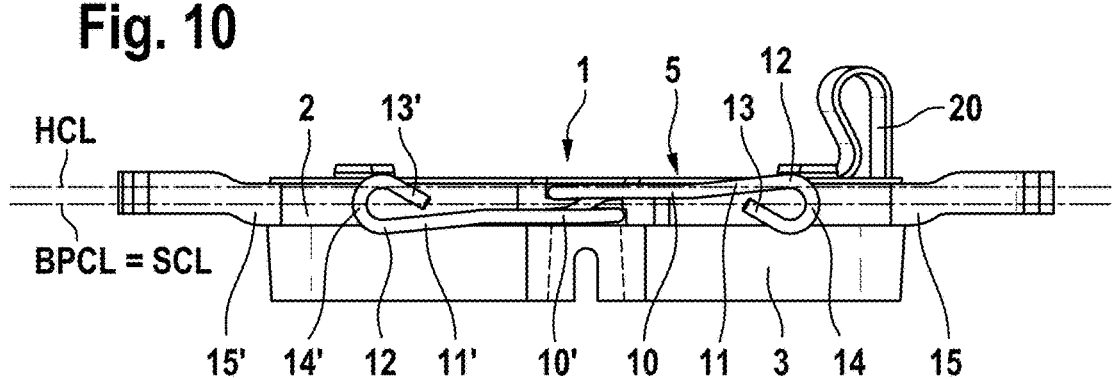
FIG. 10 illustrates a top view of an embodiment concerning brake pad system having spring seat and mounted retaining spring.

A hammerhead-shaped motor vehicle disk brake friction lining 1 with a wire helical spring 5 in the form of a hold-down spring which can be mounted so as to be fixed with a clamping fit and in a straddling position radially from the outside on a saddle protrusion. Said spring mounting arrangement serves for the purpose of imparting a substantially radially inwardly directed spring preload force to the spring-mounted friction lining 1 such that the friction lining 1 is mounted with a certain elastic preload on and in a receptacle in a holding component (that is to say the resultant spring preload force is directed in a radially inward orientation toward an imaginary wheel axis of rotation). This spring force reload of a friction lining contributes, for example, to a suppression of undesired rattling noises as a result of vibrations caused for example by sections of rough road.

In one embodiment a radial spring mounting arrangement provides air gap behavior by virtue of a soft spring characteristic curve, due to a bent shaping. The radial spring can be handled in practice and can be assembled in error-resistant fashion. The radial spring can be assembled in a reversible manner, that is to say without directional dependency in relation to a vertical axis and has a reduced tendency to tilt.

Here, the spring may be used not only new vehicles but also in existing old wheel brake systems in existing old vehicles by way of a friction lining change.

The friction lining assembly contributes to achieving environmental goals, which define that the $CO_2$ emissions behavior of a vehicle fleet must be lowered in the short to medium term, by virtue of the wire helical spring being formed from a non-rusting, alloyed steel wire material; rust-protected steel wire material (surface-treated steel wire material, for example sheathed, painted, coated or the like), which makes sustainable recycling possible, and in that the limbs 10, 10' engage with shaped profiles over the protrusion 4 such that support portions are, in relation to the longitudinal axis through the friction carrier plate 2, arranged substantially centrally in alignment with the longitudinal axis, and wherein, at the same time, a height level of the same support portions is lowered in relation to a perimeter by virtue of said support portions being arranged, in relation to the radial axis (vertical axis), substantially radially below the height level of the protrusion.

The brake lining assembly, can be implemented flexibly and in an energy-efficient manner and sustainably through the incorporation of a steel wire deformation processing center, by virtue of each steel wire helical spring 5 being formed in bent and wound fashion by cold working from a single steel wire portion. At the start of the manufacturing process, the wire deformation processing center unwinds the required steel wire blank portion in the required length from a semifinished part reel/endless wire coil and dresses and cuts off said steel wire blank portion, wherein the calibrated steel wire blank thereafter passes through the manufacturing step sequence in said processing center.

The bending fatigue strength of the wire helical spring 5 may be improved if the finished spring part or spring blank is provided with a surface treatment. The surface treatment may comprise a mechanical surface treatment, such as for example an introduction of superficial or internal compressive stress. A particle blasting, for example shot peening, surface treatment process may be used. It is alternatively or additionally possible for a surface coating to be provided such that all microcracks are closed, for example by means of a paint, coating or the like.

The steel wire helical spring 5 has two defined support contact points K1, K2 at support portions which are substantially central with respect to one another and in alignment with a longitudinal axis T, without an axis offset D with respect to one another, and which are bent in the shape of eyelets, such that a mismatch is prevented by structural design. Here, the further shaping is selected such that the longitudinal axis T through the two support contact points K1, K2 is directed parallel to a central longitudinal axis M which extends orthogonally at right angles with respect to the winding axis B of the wire helical spring 5.

The steel wire helical spring 5 furthermore allows radial spring mounting, by virtue of each support contact point K1, K2 being defined by a formed wire end in the form of an eyelet 12, 12'. Said eyelet 12, 12' is configured to be closed at an end piece side, by way of a closure limb 13, 13', Each associated closure limb 13, 13' may be angled or bent so as to be oriented in each case in the direction of the respective limb 10, 10' of the wire helical spring, in the manner of a closure, proceeding from the eyelet 12, 12'. The eyelets 12, 12' may be arranged on the respectively associated limbs 10, 10' asymmetrically with respect to one another. That is to say so as to be bent in alternate directions with respect to one another. The eyelet shaping is furthermore selected such that, in each case, a half so-called "German eyelet" may be present. To prevent damage due to displaced, erroneously loosened or otherwise separated steel wire helical springs, an end cap 14, 14' of the closure limb 13, 13' of the eyelet 12, 12' may be formed with a bevel, with a rounded edge, or some other non-sharp-edged profile.

The friction lining carrier plate 2 (backplate) may be for material purposes (safety and durability under load, closed metal-based recycling cycle, strain hardening characteristic, modulus of elasticity, ability to be coated, mounting capability), formed as a cold-worked steel sheet backplate that has been cut out of a steel sheet semifinished material (panel goods or coil goods) which is thin and planar. For example, which has a uniform thickness.

The proportions of the components involved may be adapted such that a projected thickness d of the carrier plate 2 is at least approximately equal to or greater than the greatest projected width of the wire helical spring 5, such that the wire helical spring 5, as seen in plan view, does not protrude substantially, or only protrudes insignificantly, beyond the carrier plate sides. This proportioning is assisted by virtue of the profile of all longitudinal axes T, M, at least as seen in a projection in one spatial direction, coinciding and being congruent, for example coinciding with an overall resulting center of the carrier plate 2.

Compact mutual cooperation, with radial spring mounting that is free from transverse and tilting moments, between the components involved is achieved if the height level of the two lowered support contact points K1, K2 of the two support portions is lowered in a perimeter region. The perimeter region extends at most to a top edge of the protrusion 4 of the carrier plate 2, but may be expediently provided below this. Radially to the inside of the perimeter region boundary may be selected such that the height level of the two lowered support contact points K1, K2 of the two support portions is lowered in a region that is delimited radially downwardly (radially inwardly in relation to an imaginary wheel axis of rotation) by a friction-compound-coated portion of the carrier plate 2. A height level of the two support contact points K1, K2 of the two support portions may be identical or approximately identical to, a height level of the winding axis B of the wire helical spring 5.

A spring produced by deformation and/or punching may comprise one or more zones including metallic strain hardening. Strain hardening may be provided in the spring in gradually varying and location-dependent alternating form. Here, each spring may have limbs 10, 10' with one or more areas which is/are formed as perimeter portions 11, 11' integrally formed by strain hardening and introduced with flexural rigidity. For example, a spring may have zones which have varying degrees of strain hardening zones and/or alternating zones with different degrees of strain hardening.

A perimeter portion 11, 11' may be inserted between each winding half and a support portion. Each perimeter portion 11, 11' may, for the purposes of strain-hardened bending strength, be delimited by two deformation zones comprising two bending axes. Each perimeter portion 11, 11' may be angled in non-straight form, and/or offset, for example at an oblique angle in relation to a horizontal direction.

Support contact points K1, K2 are offset at a distance with respect to one another with a lever arm such that a resultant total preload force that is transmitted via the wire helical spring 5 to a friction lining is limited in magnitude to at most approximately 70 N or less. A lower force range limit may be a resultant total preload force of at least approximately 5 N. A preload force range may be concentrated on a force value range between approximately 40-60 N at a maximum and approximately 10 N at a minimum. Furthermore, between carrier plate 2/spring saddle and wire helical spring 5, form-fitting clamping fixing may be defined on the basis of a determined average clamping force, such that a predefined pulling-off force must be imparted in order to separate this clamping fixing. The pulling-off force may be, in terms of magnitude, substantially approximately in a pulling-off force range between 2 N and 20 N. Concentration on a pulling-off force range of substantially an average pulling-off force of approximately 5 N+/−3 N is expedient for the purposes of simplifying maintenance.

A design, which is also not sensitive to corrosion, is obtained if the wire helical spring 5 is formed from a non-rusting, alloyed high-grade steel material; rust-protected high-grade steel material (surface-treated high-grade steel material, for example sheathed, painted, coated or the like) in bent form.

Here, a space-saving, arcuately encompassing perimeter limb design can be provided. Furthermore, the wire helical spring 5 may, at least as seen in a projection in one spatial direction, be bent so as to be of angled profile in the manner of a bicycle handlebar.

Each wire helical spring 5 is fixed exclusively to a disk brake lining 1, which is directly actuated (hydraulically or mechanically) by means of an actuating element, of a motor vehicle wheel brake 17. An oppositely positioned disk brake lining 1' is not equipped with a wire helical spring 5, and is actuatable indirectly by way of reaction forces, for example by way of a brake caliper housing 18.

The wire helical spring 5 is provided as a perimeter support configuration, for example for use for a hydraulically or electromechanically actuatable sliding caliper disk brake of compact construction, and is also intended for a hydraulic sliding caliper disk brake that can be actuated in combined fashion, wherein this may additionally have an electromechanically actuatable parking brake device. It is furthermore expedient if a motor vehicle disk brake friction lining 1 is suitable and intended for a motor vehicle wheel brake 17 at or in a non-driven passenger motor vehicle axle, for example for a special rear-axle brake.

A carrier plate 2, which is manufactured from steel sheet material, of the friction lining 1 is provided with a profiled configuration with hooks, by virtue of the carrier plate 2 having, laterally to the sides, two hammerhead-shaped holding protrusions, formed substantially mirror-symmetrically diametrically opposite one another, for the purposes of engaging, with an introduction of braking force, into a brake holder, and wherein the level of said two hammerhead-shaped holding protrusions is positioned uniformly below the protrusion 4 such that the engagement, with an introduction of force, into the brake holder is at the same level or at a lowered level below a brake piston axis, or furthermore alternatively substantially coincides with a brake lining center, and/or takes place at one or more of the above-stated positions in mixed form.

Further details or advantageous features, including combinations of features of the present invention, will emerge from the features of the subclaims in conjunction with the description on the basis of the drawing. Here, the drawing illustrates, in various views and partially in systematic, in some cases mutual cooperation with other features, components or assemblies, and partially diagrammatically, a) an isolated spring 5 as an individual part, b) a friction lining spring assembly and c) a motor vehicle spot-type disk brake 17 comprising a brake caliper housing 18 and having said friction lining spring assembly.

Motor vehicle (spot-type) disk brakes 17 comprise, as a system-critical wearing and exchangeable component, a disk brake friction lining 1, 1', having a carrier plate 2 which is coated, at least on one side and partially, with a friction material. A wire helical spring 5 is mounted so as to be fixed with a clamping fit and in a straddling position on a friction-material-free protrusion 4, which wire helical spring can perform a function as a friction lining hold-down spring. This is because, when the disk brake wheel brake system has been fully assembled, each associated friction lining 1 is received in a stator (normally a so-called brake holder) so as to be rotationally fixed and guided axially displaceably along a guide such that said friction lining is pressed against a brake rotor (so-called brake disk) in order to implement a friction braking demand. A friction lining 1 is prevented from moving/passing, in a radial direction, out of engagement with its (longitudinal) guide, and from emitting any rattling noises on sections of rough road owing to an ability of said friction lining to impact against any constituent part (for example so-called brake housing bridge) of a brake caliper brake housing 18, by the wire helical spring 5. The wire helical spring is braced in elastically preloaded fashion in a force flow between housing (bridge)—disk brake lining—stator (brake holder), with the consequence that the friction lining 1 is permanently elastically forced radially inward (that is to say "inward" in the direction of an imaginary wheel axis of rotation).

For orientation purposes, aside from a reference to an imaginary wheel axis of rotation, all directional and axis specifications in this context each relate in principle to the wire helical spring 5 provided separately as an individual part, by virtue of said specifications being defined, in principle, in relation to the spring winding axis (axes) thereof as a fundamental and manufacturing-related spring axial axis (in relation to a wire winding machine), and wherein a spring longitudinal axis SCL, M or spring vertical axis (that is to say radial axis) may notionally run in each case in a direction orthogonally offset with respect to the spring winding axis. However, where a systematic and/or functional cooperation of friction lining 1 and/or wire helical spring 5 in a wheel brake 17 is relevant or defined, all axis and/or directional specifications are in the present context to be understood in each case in principle as being defined in relation to the wheel axis of rotation of a motor vehicle.

The wire helical spring (hold-down spring) 5 is bent substantially symmetrically in relation to a radial axis (vertical axis) R and asymmetrically in relation to a longitudinal axis SCL, M and an axial axis. A friction lining carrier plate (so-called backplate) 2 defines, above a friction compound coating 3 that is applied on one side, a protrusion 4 having an integrated spring saddle 6 which—with respect to the longitudinal axis of the carrier plate C, BPCL—is also configured as a cavity 7 and which furthermore has a stepped and lowered profile and which has a narrowed holding edge 8 which protrudes in a direction into the center of the cavity 7, and wherein the holding edge 8 delimits the cavity 7. Under a force-fitting and/or form-fitting spreading action, two helical spring winding regions 9, 9' which are offset and spaced apart diametrically with respect to one another serve for engaging resiliently elastically, with a simultaneously matching fixing function, in interaction with the described spring saddle 6. The wire helical spring 5 is, with its winding gradient defined as right-handed in an advancing direction, fixed in form-fitting fashion over the spring saddle 6 and also rotationally fixedly on the carrier plate 2. Furthermore, the wire helical spring 5 also comprises two limbs 10, 10' which are oriented so as to be spread laterally to the sides, substantially in a tangential direction, and which serve, with support portions defined at the ends, for defined elastic abutment when placed on a brake caliper housing 18.

Based on these principles, a wire helical spring 5 is formed from a non-rusting, alloyed steel wire material; rust-protected steel wire material (surface-treated steel wire material, for example sheathed, painted, coated or the like). The wire helical spring 5 may formed from a non-rusting, alloyed high-grade steel material; rust-protected high-grade steel material (surface-treated high-grade steel material, in particular sheathed, painted, coated or the like) in bent form. The limbs 10, 10' thereof are designed with shaped profiles and so as to engage over the protrusion 4 such that the support portions thereof are, in relation to the longitudinal axis C, BPCL through the carrier plate 2, arranged substantially centrally in alignment with the longitudinal axis. In this connection, the arrangement is, in the context of the system, adapted such that a height level of the support portions is lowered by virtue of said support portions being arranged substantially radially below the height level of the protrusion 4 in relation to the radial axis (vertical axis).

The steel wire helical spring 5 designed in this way, for example of non-rusting configuration, is bent and wound by cold working, whereby a very fundamentally reduced input of energy is already achieved, along with high precision and durability.

In a furthermore detailed embodiments, the support contact points K1, K2 of the two support portions of the steel wire helical spring 5 are bent substantially centrally with respect to one another, in alignment with the longitudinal axis T and without an axis offset D. Here, the longitudinal axis T through the two support contact points K1, K2 is directed parallel to a central longitudinal axis M which extends orthogonally at right angles with respect to the winding axis B of the wire helical spring 5. Each support contact point K1, K2 is defined by an eyelet 12, 12'. The eyelet 12, 12' is configured to be substantially closed at an end piece side by way of a closure limb 13, 13', by virtue of each associated closure limb 13, 13' being angled or bent so as to be oriented in each case in the direction of the respective limb 10, 10' of the wire helical spring 5 proceeding from the eyelet 12, 12'. Here, the eyelets 12, 12' are formed on the respectively assigned limb 10, 10' so as to be oriented by asymmetrically bending with respect to one another, i.e. in alternate directions. Here, the eyelet shape may be defined in each case as a so-called "half German eyelet". An end cap 14, 14' of the closure limb 13, 13' of the eyelet 12, 12' may be formed with a bevel, with a rounding, or so as to be of some other non-sharp-edged profile, whereby, for example, manual wheel brake assembly by technicians is supported in a safe manner, or a separated steel wire helical spring 5 is of injury preventive design.

It is self-evident that a carrier plate (backplate) 2 of a disk brake lining 1 may be in principle configured as a cold-worked steel sheet backplate, which, composed of a substantially conventional structural steel, may be inexpensively protected against corrosion by being coated and/or painted. Here, a projected thickness d of the carrier plate 2 is at least approximately equal to or greater than the greatest projected width of the wire helical spring 5, such that the wire helical spring 5, as seen in plan view, substantially does not protrude, or only protrudes insignificantly, beyond the carrier plate 2. The profile of all longitudinal axes T, M, at least as seen in a projection in one spatial direction, coincides and is congruent, for example coincides with a resulting center of the carrier plate 2. The height level of the two lowered support contact points K1, K2 of the two support portions is however lowered in a region, wherein said lowered region is delimited radially outwardly (radially outwardly in relation to an imaginary wheel axis of rotation) at least by a top edge 16 of the protrusion 4 of the carrier plate 2. In a more detailed specification, the height level of the two lowered support contact points K1, K2 of the two support portions is lowered in a region, and wherein said region is delimited radially downwardly (radially inward in relation to an imaginary wheel axis of rotation) by the friction compound 3 on the carrier plate 3. In a further more detailed specification, the height level of the two support contact points K1, K2 of the two support portions approximately coincides with, or is approximately identical to, a height level of the winding axis B of the wire helical spring 5. Furthermore, the profiled shape of each spring limb 10, 10' comprises at least one region or portion which can be understood as a perimeter portion 11, 11' introduced integrally in strain-hardened, that is to say flexurally rigid form. Each perimeter portion 11, 11' of the steel wire helical spring 5 may be introduced in each case between a winding half and a support portion. Each perimeter portion 11, 11', which is of virtually flexurally rigid design, may, for the purposes of (strain-hardened) local bending strength (generated by deformation), be delimited by two lateral bending axes. Each perimeter portion 11, 11' may be angled in non-straight form, and/or offset, for example inclined obliquely in relation to a horizontal direction. Furthermore, the two support contact points K1, K2 may be offset at a distance with respect to one another with a lever arm such that an exemplary range for a resultant total housing support force, that is to say elastic preload force of the hold-down spring, wire helical spring 5, that is transmitted to an applied friction lining is limited to at most approximately 40-60 N or less. Conversely, an exemplary preload force range limitation may be provided which specifies that a resultant total clamping force in the force flow of the hold-down spring does not fall below at least approximately 5 N where possible.

Each wire helical spring 5 is, at least as seen in a projection in one spatial direction, bent so as to be of angled profile in the manner of a bicycle handlebar. In one interpretation of a system configuration, provision may be made whereby each wire helical spring 5 is fixed exclusively to a disk brake lining 1 that is directly actuated by means of an actuating element, and whereby a disk brake lining 1' positioned opposite the former disk brake lining has no wire helical spring 5 and is actuated indirectly by way of reaction forces, in particular by way of a brake caliper housing 18. In summary, the present steel wire helical spring 5 is designed for a installation-space-saving perimeter support configuration in the context of a hydraulically and/or electromechanically and also electrically actuatable sliding caliper disk brake 17. A solution for a hydraulic sliding caliper disk brake that can be actuated in combined fashion is also hereby proposed, which may additionally have an electromechanically actuatable parking brake device.

A motor vehicle disk brake friction lining 1 is accordingly suitable and intended for a wheel brake 17 at or in a non-driven passenger motor vehicle axle, for example for a special rear-axle wheel brake.

It remains to be stated, for the sake of clarity, that a carrier plate 2 of the friction lining 1 equipped is provided with a profiled configuration with hooks, by virtue of the fact that the carrier plate 2 may have, laterally to the sides, two hammerhead-shaped holding protrusions, formed substantially mirror-symmetrically diametrically opposite one another, for the purposes of engaging, with an introduction of braking force, into a brake holder, and wherein the level of said two hammerhead-shaped holding protrusions is positioned uniformly below the protrusion such that the engagement, with an introduction of force, into the brake holder is at the same level or at a lowered level below a brake piston axis, or furthermore alternatively substantially coincides with a brake lining center, and/or takes place at one or more of the above-stated positions in mixed form.

The invention claimed is:

1. A motor vehicle disk brake friction lining comprising:
a carrier plate at least partially coated on one side with a friction material, having a protrusion therefrom which at least partially defines a cavity;
a wire helical spring fixably mounted with a clamping fit, in a straddling position on the protrusion, wherein the spring is a friction lining hold-down spring bent symmetrically with respect to a radial axis and asymmetrically with respect to a spring longitudinal axis and an axial axis;
a spring saddle formed by the cavity in the protrusion with respect to a carrier plate longitudinal axis and which has a stepped and lowered profile and which has a narrowed holding edge which delimits the cavity;
two helical spring winding regions offset and spaced apart diametrically with respect to one another wherein the holding edge elastically engages each of the winding regions in a form-fitting spreading manner between the winding regions, such that the wire helical spring is mounted in form-fitting fashion over the spring saddle and rotationally fixedly on the carrier plate;
two limbs of the wire helical spring are oriented in a tangential direction and spread laterally to the sides, wherein the limbs define supporting portions at the ends for abutment against a brake caliper housing; and
wherein the wire helical spring is formed from a non-rusting, alloyed steel wire material; rust-protected steel wire material, and the limbs engage with shaped profiles over the protrusion such that support contact points on the supporting portions of the limbs, arranged substantially centrally in alignment with the carrier plate longitudinal axis, and wherein the support contact points are below the protrusion along the radial axis.

2. The motor vehicle disk brake friction lining as claimed in claim 1, wherein the support contact points of the two supporting portions are provided so as to be bent substantially centrally with respect to one another, along a longitudinal axis T, without an axis offset.

3. The motor vehicle disk brake friction lining as claimed in claim 2, wherein the longitudinal axis T through the two support contact points is parallel to a central longitudinal axis which extends orthogonally at right angles with respect to the winding axis of the wire helical spring.

4. The motor vehicle disk brake friction lining as claimed in claim 2, wherein the longitudinal axis T and the spring longitudinal axis are congruent with the carrier plate longitudinal axis in at least one direction.

5. The motor vehicle disk brake friction lining as claimed in claim 1, wherein each support contact point is defined by an eyelet.

6. The motor vehicle disk brake friction lining as claimed in claim 5, wherein the eyelet is fundamentally closed at an end piece side with a closure limb, by virtue of each associated closure limb being angled so as to be oriented in each case in the direction of the respective limb of the wire helical spring proceeding from the eyelet.

7. The motor vehicle disk brake friction lining as claimed in claim 5, wherein the eyelets are formed on the respectively assigned limb so as to be bent asymmetrically with respect to one another.

8. The motor vehicle disk brake friction lining as claimed in claim 5, wherein the eyelets are each a one half German eyelet.

9. The motor vehicle disk brake friction lining as claimed in claim 5, wherein an end cap of the closure limb of the eyelet is formed with at least one of a bevel, a rounding, and of a non-sharp-edged profile.

10. The motor vehicle disk brake friction lining as claimed in claim 1, wherein the carrier plate is formed as a cold-formed steel sheet backplate.

11. The motor vehicle disk brake friction lining as claimed in claim 1, wherein the carrier plate has two lateral side protrusions which are angled in a offset manner in the axial direction.

12. The motor vehicle disk brake friction lining as claimed in claim 1, wherein a projected thickness of the carrier plate is at least approximately equal to or greater than a greatest projected width of the wire helical spring, such that the wire helical spring as seen in plan view does not substantially protrude, or only protrudes insignificantly beyond the projected carrier plate thickness.

13. The motor vehicle disk brake friction lining as claimed in claim 1, wherein the height level of the two lowered-support contact points of the two support portions in a lowered position, is delimited radially upwardly by a top edge of the protrusion of the carrier plate.

14. The motor vehicle disk brake friction lining as claimed in claim 1, wherein the height level of the two lowered-support contact points of the two support portions in a lowered position is delimited radially downwardly by the friction compound of the carrier plate.

15. The motor vehicle disk brake friction lining as claimed in claim 1, wherein the height level of the two support contact points of the two bearing portions coincides with a height level of the winding axis of the wire helical spring.

16. The motor vehicle disk brake friction lining as claimed in claim 1, wherein a profile of each limb is-configured as a perimeter portion is strain-hardened.

17. The motor vehicle disk brake friction lining as claimed in claim 16, wherein each perimeter portion is between a winding half and a bearing portion.

18. The motor vehicle disk brake friction lining as claimed in claim 1, wherein each perimeter portion is bent in two locations for the purposes of flexural stiffening.

19. The motor vehicle disk brake friction lining as claimed in claim 1, wherein each perimeter portion is one of angled in non-straight form, offset, and inclined obliquely in relation to a horizontal direction.

20. The motor vehicle disk brake friction lining as claimed in claim 1, wherein the support contact points are offset at a distance with respect to one another to act as a lever arm such that a resultant total housing bearing force that is transmitted via the wire helical spring is limited to 60 newtons or less.

21. The motor vehicle disk brake friction lining as claimed in claim 1, wherein a resultant total housing bearing force is at least 5 N.

22. The motor vehicle disk brake friction lining as claimed in claim 1, wherein the wire helical spring is detachably fixed to the carrier plate with an elastic clamping force in a range between 2 newtons and 20 newtons.

23. The motor vehicle disk brake friction lining as claimed in claim 22, wherein an average pulling-off force for the detachment of the wire helical spring is defined as being in a range of 2 to 10 newtons.

24. The motor vehicle disk brake friction lining as claimed in claim 1, wherein the wire helical spring is formed from a non-rusting, alloyed high-grade steel material; rust-protected high-grade steel material in bent form.

25. The motor vehicle disk brake friction lining as claimed in claim 1, wherein the wire helical spring has an angled profile which is similar to a profile of a bicycle handlebar that is having a symmetric profile with a central section that is generally flat, two connecting sections at either end of the central section, each extending at angle from the central section and two end sections extending at a second angle from an opposing end of the connecting sections.

26. The motor vehicle disk brake friction lining as claimed in claim 1, wherein each wire helical spring is fixed exclusively to a disk brake lining that is directly actuated with an actuating element, and a disk brake lining positioned opposite the former disk brake lining has no wire helical spring and is actuated indirectly by way of reaction forces.

27. The motor vehicle disk brake friction lining as claimed in claim 1, wherein the wire helical spring is provided for one of a hydraulically and electromechanically actuatable sliding caliper disk brake and a hydraulic sliding caliper disk brake that can be actuated in combined fashion, and a hydraulic sliding caliper disk brake having an electromechanically actuatable parking brake device.

28. The motor vehicle disk brake friction lining as claimed in claim 1, wherein the motor vehicle disk brake friction lining is suitable and intended for a wheel brake at or in a non-driven passenger motor vehicle axle.

29. The motor vehicle disk brake friction lining as claimed in claim 1, wherein the carrier plate of the motor vehicle disk brake friction lining is provided with a profiled configuration wherein the carrier plate has, laterally to the sides, two hammerhead-shaped holding protrusions, formed symmetrically diametrically opposite one another, for the purposes of engaging, with an introduction of braking force, into a brake holder, and wherein the level of said two hammerhead-shaped holding protrusions is positioned uniformly below the protrusion such that the engagement, with the introduction of braking force, into the brake holder is at least one of at the same level of a brake piston axis, below the brake piston axis, at a center axis of the brake lining.

30. A wire helical spring for fixing to a carrier plate of a motor vehicle spot-type disk brake lining comprising:
two limbs which are angled and offset laterally to the sides and comprise support portions;
wherein the wire helical spring is formed from a non-rusting, alloyed steel wire material, or rust-protected steel wire material, and limbs are profiled in bent form with shaped profiles such that the support portions thereof are arranged substantially centrally in relation to the longitudinal axis through the carrier plate; and
wherein a height level of said support portions is lowered by virtue of said height level being arranged, in relation to the radial axis substantially radially below a height level of the protrusion.

31. The helical spring of claim 30, further comprising a brake caliper housing and a disk brake lining having the helical spring in the form of a hold-down spring.

* * * * *